United States Patent [19]

O'Brien et al.

[11] 3,923,491
[45] Dec. 2, 1975

[54] GROWTH REGULANTS FOR PLANTS

[75] Inventors: John B. O'Brien, Watertown, Conn.; Herman Stone, Andover, Mass.

[73] Assignee: Allied Chemical Corporation, New York, N.Y.

[22] Filed: Aug. 9, 1973

[21] Appl. No.: 387,053

[52] U.S. Cl. .......................... 71/76; 71/76; 71/88; 71/90; 71/92; 71/94; 71/100; 71/106; 71/107; 71/113; 71/115; 71/118
[51] Int. Cl.² .......................................... A01N 5/00
[58] Field of Search .................. 71/113, 76, 77, 121

[56] References Cited
UNITED STATES PATENTS

| | | | |
|---|---|---|---|
| 2,416,198 | 2/1947 | Moyer | 71/113 |
| 3,148,049 | 9/1964 | Herschler | 71/106 |
| 3,515,536 | 6/1970 | Hill et al. | 71/121 |

OTHER PUBLICATIONS

Barry et al., "α–Oximino Acid Intermediates for the Synthesis Etc.," (1946), J. Org. Chem., pp. 460–468, (1947).

Primary Examiner—Glennon H. Hollrah
Attorney, Agent, or Firm—Arthur J. Plantamura; Jack B. Murray, Jr.

[57] ABSTRACT

A method of improving the yield of plants such as legumes by the application thereto of plant growth regulants comprising α-oximino alkanoic acids and derivatives thereof having the general formula:

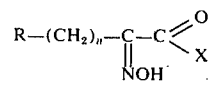

wherein $n$ is an integer from 1 to 12, R is selected from the group consisting of hydrogen, alkyl, cycloalkyl, aralkyl, alkaryl, aryl, heterocyclic, alkenyl and alkynyl, and X is selected from the group consisting of OZ, SZ, NZZ' and OZ'' in which Z and Z' are independently selected from the group consisting of hydrogen, alkyl, cycloalkyl, aralkyl, alkaryl, aryl, heterocyclic, alkenyl and alkynyl and in which Z'' is an alkali metal.

6 Claims, No Drawings

GROWTH REGULANTS FOR PLANTS

FIELD OF THE INVENTION

This invention relates to compounds having a growth regulating effect when applied to plants. The compounds are of particular value for increasing the yield per plant and per acre of agronomic crops such as legumes.

SUMMARY OF THE INVENTION

The yield of certain plants, particularly agronomic crops, such as legumes, can be improved advantageously by applying to the plants an effective amount of one or more of the plant growth regulants described below.

By the application of these growth regulants to crops such as legumes the yield per plant, as well as the yield per acre, may be improved 10 percent or more, as compared to untreated control plantings. The number and size of the fruit and seed are increased by the application of these growth regulants. Moreover, the plant height of the plants is decreased by the application of the growth regulants, thereby causing the plants to remain upright and preventing yield loss which occurs during the harvesting of taller untreated plants which tend to lean over close to the ground, a condition termed "lodging".

DESCRIPTION OF THE INVENTION

The plant growth regulants of the present invention are α-oximino alkanoic acids and derivatives thereof having the general formula:

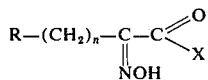

wherein n is an integer from 1 to 12, R is selected from the group consisting of hydrogen, alkyl, cycloalkyl, araalkyl, alkaryl, aryl, heterocyclic, alkenyl and alkynyl, and X is selected from the group consisting of OZ, SZ, NZZ' and OZ'' in which Z and Z' are independently selected from the group consisting of hydrogen, alkyl, cycloalkyl, aralkyl, alkaryl, aryl, heterocyclic, alkenyl and alkynyl, and in which Z'' is an alkali metal.

The alkyl group generally contains from 1 to 12 carbon atoms and preferably contains from 1 to 5 carbon atoms. Examples of such alkyl groups are methyl, isobutyl, pentyl, and dodecyl. The cycloalkyl group generally contains from 3 to 12 carbon atoms and preferably contains from 3 to 6 carbon atoms. Examples of such groups are cyclobutyl, cyclohexyl and cyclooctyl. The aralkyl group generally consists of phenyl or alkyl substituted phenyl as the aryl substituent and an alkyl substituent having from 1 to 12 carbon atoms and preferably 1 to 6 carbon atoms. Examples of such aralkyl groups are benzyl, o-ethylbenzyl, 5-phenylpentyl, and 6-phenyldodecyl. The alkaryl group generally consists of phenyl or tolyl as the aryl substituent and alkyl substituent having 1 to 12 carbon atoms and preferably from 1 to 6 carbon atoms. Examples of such alkaryl groups are tolyl, o-ethyltolyl and m-hexyltolyl. The aryl group is generally phenyl. Heterocyclic groups such as thienyl, pyridyl and piperidyl may be employed. In addition, the moiety —NZZ' may comprise a heterocyclic group such as

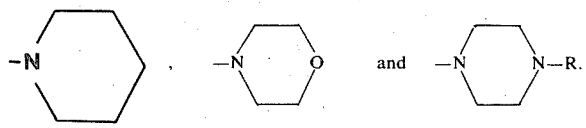

The alkenyl group generally contains from 3 to 12 carbon atoms and preferably contains from 3 to 5 carbon atoms. Examples of such alkenyl groups are propenyl, butenyl and decenyl. The alkynyl group generally contains from 3 to 12 carbon atoms and preferably from 3 to 6 carbon atoms. Examples of such alkynyl groups are propynyl, hexynyl and decynyl.

Examples of plant growth regulants of the present invention wherein R is selected from the group consisting of hydrogen, alkyl, cycloalkyl, aralkyl, alkaryl, aryl, heterocyclic, alkenyl and alkynyl and wherein X is selected from the group consisting of OZ, SZ and NZZ' in which Z and Z' are as defined above are: octyl 2-oximinododecanoate, dodecyl 2-oximinodecanoate, octyl 6-cyclobutyl-2-oximinohexanoate, cyclohexyl 6-cyclohexyl-2-oximinohexanoate, cyclooctyl 12-phenyl-2-oximinododecanoate, benzyl 6-phenyl-2-oximinohexanamide, benzyl 12-(m-tolyl)-2-oximinododecanoate, m-tolyl 8-(o-ethylbenzyl)-2-oximinooctanoate, phenyl 5-(2-thienyl)-2-oximinopentanoate, m-tolyl 3-(2-pyridyl)-2-oximinopropanoate, o-ethylbenzyl 4-(2-propynyl)-2-oximinobutanoate, m-isobutylbenzyl 10-(2-propenyl)-2-oximinodecanoate, 2-thienyl 6-(2-hexynyl)-2-oximinohexanoate, 2-pyridyl 12-(2-hexenyl)-2-oximinododecanoate, N-piperidyl 11-phenyl-2-oximinoundecanoate, 2-propenyl 6-phenyl-2--oximinohexanoate, 2-decenyl 8-(n-phenylpentyl)-2-oximinooctanoate, 2-butenyl 2-oximinoheptanoate, 2-propynyl 2-oximinohexanoate, 2-decenyl 10-(m-isobutylbenzyl)-2-oximinodecanoate, 2-hexynyl 12-phenyl-2-oximinododecanoate, 2-oximinopentanoic acid, 5-methyl-2-oximinohexanoic acid, 2-propynyl 2-oximinopentanoate, N,N-dibutyl 6-methyl-2-oximinoheptanamide, N-cyclohexyl 2-oximinobutanamide, N-piperidino 2-oximinopentanamide, N-ethyl, N-(m-tolyl)-2-oximinodecanamide, 2 -oximinohexanoic acid, phenyl 7-(m-tolyl)-2-oximinothioheptanoate, 2-oximinopentanoic acid and ethyl 10-(2-butenyl)-2-oximinothiodecanoate.

Examples of plant growth regulants in which the X group in the general formula is OZ'' are sodium 7-cyclobutyl-2-oximinoheptanoate, potassium 9-isobutyl-2-oximinooctanoate and lithium 3-cyclohexyl-2-oximinopropanoate.

An α-oximino alkanoic acid which is an especially preferred plant growth regulant is 2-oximinohexanoic acid.

Plant growth regulants of the present invention are known and may be prepared by conventional means. For example, 2-oximinohexanoic acid may be prepared by reacting n-butyl nitrite and dry hydrogen chloride with n-butylmalonic acid as described in R. H. Barry and W. H. Harting, 12 J. Org. Chem., 460 (1947).

The plant growth regulants of the present invention are applied as compositions prepared by admixing one or more of the plant growth regulants of the present invention as the active ingredient in plant growth regulative effective amounts with a material of the kind used and referred to in the plant growth regulant art as an inert carrier or diluent in order to provide formulations adapted for ready and efficient application to plants (i.e., crop plants such as legumes) using conventional applicator equipment. In other words, the active ingredient is mixed with an additional material or materials of a kind known in the art to provide a formulation adapted for ready application by conventional means such as through suitable jets, nozzles, spreaders and similar devices.

It is preferred that the compositions contain active ingredient in a concentration of between about 10 and 3000 ppm by weight, and most preferably between about 100 and 1000 ppm by weight. In the case of legumes such as a soybean crop having plants spaced four to the foot in 30 inch rows, less than about 8 pounds, and preferably between 0.025 and 4.0 pounds, of the active ingredient may be applied per acre in order to effect the desired plant growth regulation. Application of more than about eight pounds of active ingredient per acre to such plants tends to produce an undesired phytotoxic effect upon the plants. Application of less than about 0.025 pound of active ingredient per acre tends to become uneconomical since repeated applications become necessary in order to achieve the desired growth regulation.

The compositions containing the plant growth regulants may be prepared in the form of a solid or liquid such as a solution, emulsion, suspension, wettable powder, granules, pellets or dust according to the intended use. Solid compositions, for example, may be prepared in the form of wettable powders and are compounded to give homogeneous free-flowing powders by milling or admixing the active ingredient with finely divided solids, such as clay, fuller's earth, diatomaceous earth, charcoal, chalk and the like, together with wetting and dispersing surface-active agents. Solid compositions may also be in the form of dust formulations which may be prepared by mixing or blending the active ingredient with a finely divided solid carrier as indicated above, or the active ingredient may be impregnated on or incorporated into granules or pellets.

Where liquid compositions are prepared as solution, emulsion or suspension, such compositions may also be conveniently prepared as concentrates containing about five to thirty percent by weight of active ingredient which can be diluted in the field with a suitable non-phytotoxic solvent prior to use. Examples of suitable, non-phytotoxic solvents include acetone, dimethylformamide, methanol, or mixtures thereof, in addition to water. Such liquid compositions also preferably contain a surface-active agent, that is, an emulsifying agent.

The surface-active agents employed with the solid or liquid compositions serve to improve wetting, thus ensuring good delivery of the active ingredient to all parts of the plant and preventing build-up of high concentrations of active ingredient on the foliage which might produce leaf burn. These surface-active agents can be of the anionic, cationic or nonionic type. Such compounds can be found listed by J. B. McCutcheon in "Soap and Chemical Specialties" for December, 1957 and January, February, March and April of 1958. In addition, surfactants such as Tween-20 (tradename for a series of polyoxyethylene derivatives of fatty acid partial esters of sorbitol anhydrides) may also be employed. Generally, the surface-active agent will not comprise more than about 1 to 10 percent by weight of the formulation.

The effectiveness of the application is particularly enhanced if there is also incorporated into the composition a sticking agent. The sticking agent serves to increase the retention time of the active ingredient on the foliage, thereby reducing the number of applications required to achieve the desired plant growth regulation. Non-phytotoxic sticking agents, such as a readily emulsified oxidized polyethylene wax as in U.S. Pat. No. 2,976,210 (issued in 1961 to Cosby et al.), may be employed in an amount ranging from about 0.1 to 1.0 pound per 100 pounds of composition.

While increased yield of soybean crops can be effected by a single application of the above growth regulants of this invention, two or more applications may be made and are particularly advantageous if rain follows the first or subsequent application. The most convenient means of applying the growth regulators is spraying by airplane. In areas where aerial spraying is impractical, however, the solutions can be effectively sprayed from trucks or with hand spraying equipment.

It has been further discovered that the application of the $\alpha$-oximino alkanoic acids and derivatives to plants producing ornamental flowers such as chrysanthemums, effects both a decreased plant height and an increased flower size and thereby provides a more full, compact plant having an aesthetic appearance superior to chrysanthemums generally available in the market.

This invention may be further illustrated by reference to the following examples:

EXAMPLE 1

Several acres of an Arkansas field are sown with soybean plants (Davis) such that the plants when mature are spaced about four plants per foot in rows separated by about 30 inches. A concentrate is prepared by dissolving 280 grams of $\alpha$-oximino hexanoic acid in 1240 milliliters of a solvent having the volume percent composition: 36% acetone and 64% water. This concentrate is then diluted with water in the field to 40 gallons. To this solution is added 0.1 percent by weight of Tween-20 spreading agent.

This solution is evenly applied as a spray to foliage of one acre of the soybean plants at the early flowering stage thereby consuming the 40 gallons and effecting an application of the active ingredient of 280 grams per acre.

At the end of a 12 week period, the crop is harvested and compared to another acre of the same field which has been sprayed with water simultaneously with the spraying of the test field to thus serve as a control. The results are shown below:

|  | CONTROL | TREATED SOYBEANS |
|---|---|---|
| Weight (Grams) of 100 Seeds | 15.3 | 15.9 |
| Pods per plant (Avg.) | 138 | 167 |
| Seeds per plant (Avg.) | 276 | 334 |
| Yield (Bushels per acre) | 45.4 | 51.1 |

It can be seen from the above that the application of the plant growth regulant effects about a 13 percent increase in the yield of soybeans.

EXAMPLE 2

Several acres of an Arkansas field are sown with soybean plants (Davis) such that the plants when mature are spaced about 4 plants per foot in rows separated by about 30 inches. A concentrate is prepared by dissolving 750 grams of $\alpha$-oximino hexanoic acid in 1240 milliliters of a solvent having the volume percent composition: 36% acetone and 64% water. This concentrate is then diluted with water in the field to 40 gallons. To this solution is added 0.1 percent by weight of a Tween-20 spreading agent.

This solution is then evenly applied as a spray to foliage of one acre of the soybean plants at the early flowering stage, thereby consuming the 40 gallons and effecting an application of the active ingredient of 750 grams per acre.

At the end of a 12 week period, the crop is harvested and compared to another acre of the same field which has been sprayed with water simultaneously with the spraying of the test field to thus serve as a control. The results are shown below:

|  | CONTROL | TREATED SOYBEANS |
|---|---|---|
| Weight (Grams) of 100 Seeds | 14.2 | 15.7 |
| Pods per plant (Avg.) | 131 | 159 |
| Seeds per plant (Avg.) | 249 | 254 |
| Yield (Bushels per acre) | 39.3 | 42.4 |

It can be seen from the above that the application of the plant growth regulant effects about an 8 percent increase in the yield of the soybeans.

We claim:

1. A method for increasing the yield of leguminous and ornamental plants via height retardation which comprises applying to said plants an effective amount of a compound having the formula:

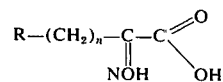

wherein $n$ is an integer from 1–12 and R is selected from the group consisting of hydrogen, alkyl of 1–12 carbon atoms, cycloalkyl of 3–12 carbon atoms, alkenyl of 3–12 carbon atoms and alkynyl of 3–12 carbon atoms.

2. The method of claim 1 wherein R is alkyl.
3. The method of claim 2 wherein the compound is 2-oximinohexanoic acid.
4. The method of claim 1 wherein the plants are legumes.
5. The method of claim 4 wherein the legumes are soybean plants.
6. The method of claim 1 wherein the compound is applied to the plant between the period of early flowering and early maturation of the fruit.

* * * * *